United States Patent [19]

Vigreux et al.

[11] 3,966,297

[45] June 29, 1976

[54] DEVICE FOR OBSERVING AN EQUIPMENT UNDER TENSION

[75] Inventors: Jacques Vigreux; André Gromier, both of Lyon, France

[73] Assignee: Delle-Alsthom, Villeurbanne, France

[22] Filed: May 28, 1974

[21] Appl. No.: 473,978

[30] Foreign Application Priority Data
June 1, 1973 France .................. 73.20100

[52] U.S. Cl. .................. 350/52; 73/334; 350/82; 350/91; 350/301; 356/7; 356/241; 432/32
[51] Int. Cl.² .................. G02B 23/08
[58] Field of Search .............. 350/52, 91, 319, 301, 350/82; 356/241; 240/2 M; 324/96; 356/7; 73/334, 330, 331; 248/251; 432/32; 431/13–17; 74/503, 526

[56] References Cited
UNITED STATES PATENTS

| | | | |
|---|---|---|---|
| 825,241 | 7/1906 | Pino | 350/91 |
| 1,480,112 | 1/1924 | Poppenhusen | 350/301 |
| 1,667,362 | 4/1928 | Van Der Vliet | 74/503 |
| 1,837,208 | 12/1931 | Cover | 350/52 |
| 2,015,869 | 10/1935 | Pulz | 350/82 |
| 2,325,253 | 7/1943 | Laging | 350/301 |
| 2,409,328 | 10/1946 | Wilder | 240/2 M |
| 2,942,469 | 6/1960 | Le Roy | 73/334 |
| 2,968,208 | 1/1961 | Shaw | 350/52 |
| 3,423,145 | 1/1969 | Breitengross | 350/52 |
| 3,496,348 | 2/1970 | Lowery | 315/319 |
| 3,515,465 | 6/1970 | Jones | 73/334 |
| 3,749,344 | 7/1973 | Racina | 248/251 |

OTHER PUBLICATIONS

Monthly Abstract Bulletin (Eastman Kodak) vol. 36, No. 9, p. 413, Sept. 1950.

*Primary Examiner*—John Kominski
*Attorney, Agent, or Firm*—Sughrue, Rothwell, Mion, Zinn & Macpeak

[57] ABSTRACT

Device for observing electrical equipment under voltage application, characterized in that it comprises an adjustable periscopic glass which include a lens assembly which conforms to and interfits with the observation ports within the equipment and carries within the lens assembly adjacent the periphery a light source for illumination of the equipment enclosure interior.

1 Claim, 6 Drawing Figures

U.S. Patent  June 29, 1976  Sheet 1 of 2  3,966,297
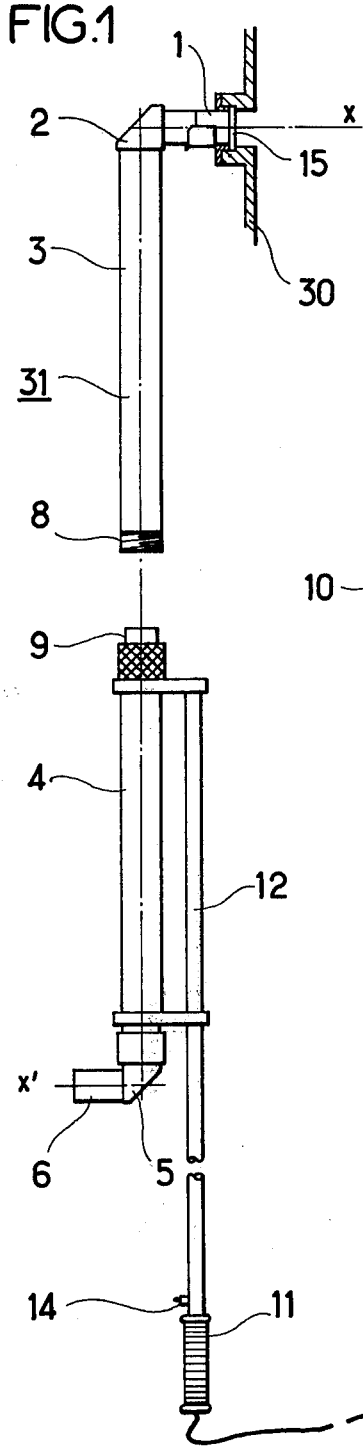
FIG.1
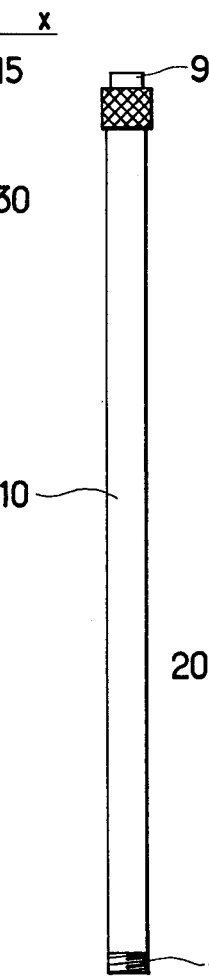
FIG.2
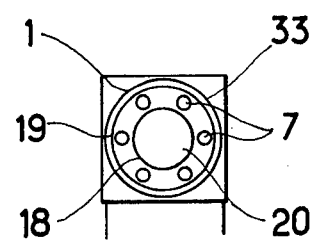
FIG.3
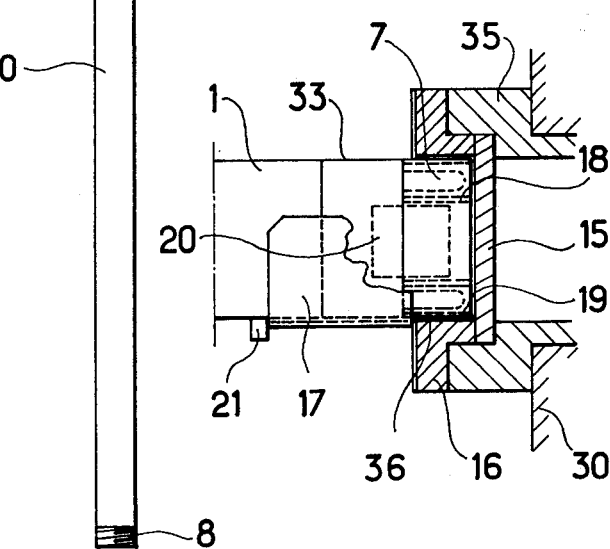
FIG.4
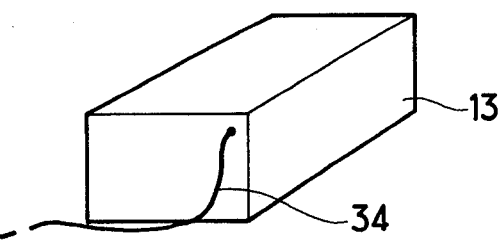

DEVICE FOR OBSERVING AN EQUIPMENT UNDER TENSION

BACKGROUND OF THE INVENTION

1. Field Of The Invention

The invention relates to a device for observing an electrical equipment under voltage arranged in a protected enclosure, through a port.

2. Description Of The Prior Art

Such an enclosure is generally opaque and does not easily make it possible to observe the opening or closing position of the various connection elements of the electrical equipment. That is why it is a conventional arrangement to provide, at the surface of the enclosure, observation ports. But in certain installations, more particularly of the high-tension type, this equipment is not readily accessible and it is necessary to make use of access means such as staircases or bridges.

Now, these means of access are both bulky and expensive; moreover, the lighting up of the inside of the enclosure generally requires the presence of an extra port, for the use of an internal lighting system frequently sets difficult problems for the layout of the field round the lighting device and for the changing of the lamp inside a sealed enclosure under pressure.

The aim of the present invention is to enable the observing of the elements of an equipment placed in an opaque enclosure, through a single port and in minimum bulk conditions.

The invention has for its object a device for observing an equipment under tension arranged in an opaque enclosure, through a port with which the said enclosure is provided, characterized in that it comprises a glass whose lens is arranged facing the external face of the port.

According to one characteristic, the port is provided on its external face with a means for positioning the lens of the glass according to other characteristics, the positioning means comprises a receptacle in the shape of a trough and the ferrule of the lens is provided with a stud intended to abut against the front part of the receptacle.

According to a characteristic, the lens of the glass is provided with a light source spaced out round its periphery; according to another characteristic, the light source is arranged between two opaque cylindrical screens coaxial with the axis of the lens, the ends of the said screens constituting a protuberance with respect to the lens.

According to another characteristic, the port comprises a fixing part provided with a recess intended for having the ferrule of the lens fitted into it.

The characteristics and advantages of the invention will become apparent from the description of an embodiment, given by way of an example and illustrated in the drawings.

BRIEF DESCRIPTION OF THE DRAWINGS

FIG. 1 is an exploded general diagrammatic view of a device according to the invention.

FIG. 2 is a view of an intermediate element.

FIG. 3 is an enlarged front view of the lens.

FIG. 4 is an enlarged axial cutaway view of the assembly of the port with the lens.

DESCRIPTION OF THE PREFERRED EMBODIMENT

Figure 5:
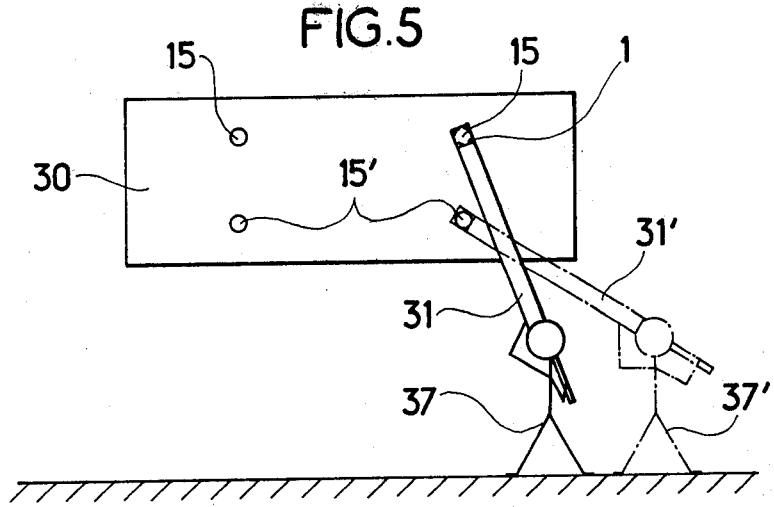
FIG. 5 is an elevation view of an illustration of the implementing of the device.

In FIG. 1, 30 designates an element of the wall of an opaque enclosure containing an electrical equipment, not shown; that wall comprises an opening through which an observation or viewing port 15 is fixed. Facing that port, the lens assembly 1 of a periscopic glass which, as a whole, is designated by 31, is arranged.

The periscopic glass 31 comprises, moreover, from top to bottom, an optical reflector 2, a first tube provided with a threaded end 8 on which may be screwed the threaded sleeve 9 of a second tube 4 comprising, at its end, a second optical reflector 5 at right angles and an eye-piece 6 which may be set in any position through 360° about the axis of the tube 4. The tube 4 is provided with a support rod 12 having, at its end, a maneuvering handle 11. The optical axis of the glass has been materially shown through X X'.

Observation may be effected from the lower part of the tube 4, but that arrangement generally forces the observer to take up an uncomfortable position and preferably, the eye-piece 6 is preceded by that second optical reflector 5.

According to the length required by the distance between the port 15 and the eye-piece 6, it is possible to insert between the end 8 of the tube 3 and the threaded sleeve 9, intermediate tubes 10 each provided also with a threaded end 8 and a threaded sleeve 9, as shown in FIG. 2.

FIG. 3 shows light sources 7 constituted by lamps circumferentially spaced about the periphery of the lens 20 of the lens assembly 1. These light sources are arranged between two cylindrical screens 18 and 19 which are opaque and coaxial with the axis of the lens assembly 1. The assembly is held inside a ferrule 33. The light sources are fed by a battery 13 through an electric line 34 and a switch 14.

FIG. 4 shows in greater detail the assembling of the port with the lens assembly 1. The port 15 is held by a fixing part 16 and a flange 35 fast with the wall 30. The fixing part 16 is provided with a receptacle 17 in the shape of a trough on which the ferrule 33 of the lens assembly 1 bears; The ferrule is itself provided with a stud 21 which abuts against the front part of the receptacle 17. Moreover, the fixing part 16 comprises a cylindrical recess 36 into which is fitted the end of the ferrule 33. The ends of the screens 18 and 19 which protrude with respect to the lamps 7 and to the lens 20 of the lens assembly 1, abut against the port 15, but a slight distance separates the port from the ends of the screens.

The operation of the device is as follows. As a function of the distance separating the port from the observer, whose eye should be situated before the eye-piece 6, as many intermediate tubes 10 as are necessary for the glass to have a sufficient length are inserted between the tubes 3 and 4. The glass is grasped in both hands, one on the handle 14, whereas the battery is left on the ground. Then the glass is raised until the lens assembly 1 is at the level of the port 15. The end of the ferrule 33 is fitted to the receptacle 17 until the stud 21 abuts against that receptacle, a position in which the end of the ferrule fits into the cylindrical recess 36. The receptacle ensures the positioning and the maintaining of the glass and the axis of the lens assembly may turn about the axis common to the port 15 and to the receptacle 17, this making observation by ports situated in different positions with respect to the observer easier.

The presence of a cylindrical screen 18 having a sufficient thickness has the advantage of reducing considerably the reflection through the lens 20 of interference light rays emitted by the lamps 7 in the port 15 and of preventing dazzling. These interference reflections would make observation inside the enclosure very difficult; an increase in the thickness of the internal screen 18 is capable of reducing the intensity of the rays reflected in the lens 20. Moreover, the protruding of the screens with respect to the lamps and to the lens protects them against possible mechanical shocks during manoeuvring; the stud 2 is itself arranged so as to avoid a shock between these screens and the port 15 when the lens assembly is installed.

The positioning and the maintaining of the glass may be provided whatever the inclination of the glass may be, as shown in FIG. 5. The wall 30 of the opaque enclosure comprises as many ports as there are lower compartments to be observed. The ports 15 are at a higher level than that of the ports 15'. An inclination of the glass 31 enabling the observer 37 to have his eye against the eye-piece corresponds to the ports 15. That inclination is greater than that obtained for observation through the ports 15' with the glass 31' and the observer 37'.

Figure 6:
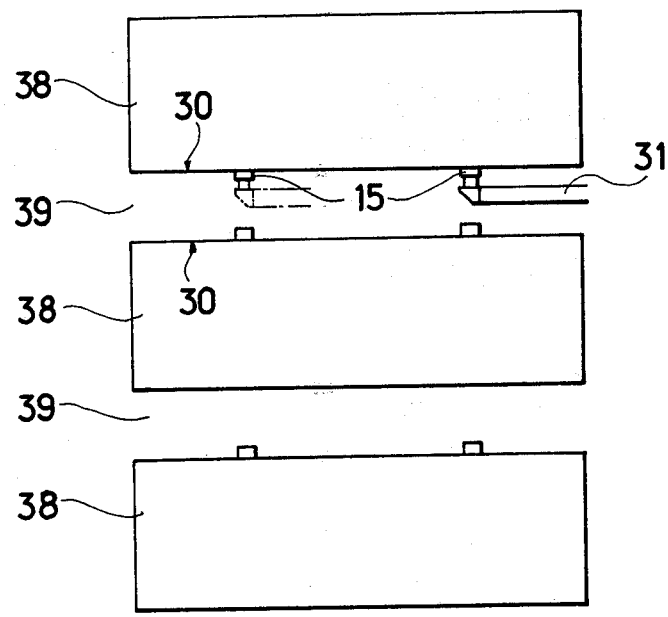
FIG. 6 is a plan view of the illustration of the implementing of the device according to FIG. 5.

Such a periscopic glass enables observation through ports situated between enclosures very close together, as it is current to find with a three-pole equipment. FIG. 6 shows an equipment comprising three poles 38; the distances between the enclosures of the poles being particularly short, observation may hence be effected from access passages 39 arranged laterally or under the equipment. Lastly, the operator no longer has to bear the whole weight of the instrument.

It is quite evident that the invention is not limited to the embodiment which has just been described and illustrated; various modifications may be made thereto; more particularly, without going beyond the scope of the invention, certain arrangements may be modified or certain means may be replaced by equivalent means.

Thus, more particularly, instead of using intermediate tubes for modifying the length of the glass, a telescopic glass may be used.

Likewise, instead of using a battery and a line with a view to feeding the light source, one or several cells incorporated in the glass may be used.

We claim:

1. In an optical observation device for viewing the condition of high voltage equipment within an opaque electrical apparatus enclosure through a cylindrical viewing port within the enclosure wall covered by a viewing glass, and forming an annular recess outwardly of said viewing glass, said device comprising:
    a periscope terminating at one end in a tubular lens assembly, the improvement comprising:
    periscope support means comprising an annular securing element received within said recess of said enclosure wall port and having a trough extending outwardly therefrom for supporting said tubular lens assembly in axial alignment and juxtaposed to said viewing port glass, and
    said lens assembly comprising a cylindrical ferrule, a cylindrical lens centrally mounted within said ferrule and radially spaced therefrom, and a light source mounted within said ferrule and about the lens periphery with said light source facing said port glass for directly illuminating the enclosure interior through said port viewing glass, and a cylindrical screen interposed between said cylindrical lens and said light source and extending in the direction of said viewing glass to direct light from said light source through said viewing glass into the interior of said enclosure and prevent direct light impingement from said light source on said cylindrical lens.

* * * * *